(12) United States Patent
Hsu (10) Patent No.: US 10,858,795 B1
(45) Date of Patent: Dec. 8, 2020

(54) QUICK-FIT SELF-PRIMING DRAIN PIPE

(71) Applicant: Yung-Chien Hsu, New Taipei (TW)

(72) Inventor: Yung-Chien Hsu, New Taipei (TW)

(73) Assignee: Hope Technology Co., Ltd., New Taipei (TW)

(*) Notice: Subject to any disclaimer, the term of this patent is extended or adjusted under 35 U.S.C. 154(b) by 0 days.

(21) Appl. No.: 16/576,792

(22) Filed: Sep. 20, 2019

(51) Int. Cl.
  *E02B 11/00* (2006.01)
  *F16L 37/133* (2006.01)
  *E03F 1/00* (2006.01)

(52) U.S. Cl.
  CPC ............. *E02B 11/005* (2013.01); *E03F 1/00* (2013.01); *F16L 37/133* (2013.01)

(58) Field of Classification Search
  CPC ........ E02B 11/005; F16L 137/133; E03F 1/00
  See application file for complete search history.

(56) References Cited

U.S. PATENT DOCUMENTS 2,981,072 A * 4/1961 Brewington
3,465,529 A * 9/1969 Helle
3,623,500 A * 11/1971 Hoy
5,458,441 A * 10/1995 Barry
5,836,716 A * 11/1998 Johnson et al.
6,076,992 A * 6/2000 Fukui et al.
2002/0172557 A1* 11/2002 Chen
2008/0267709 A1* 10/2008 Terry
2010/0025982 A1* 2/2010 Jamison

FOREIGN PATENT DOCUMENTS

FR  1376415 A  * 10/1964
FR  2420071 A1 * 10/1979

* cited by examiner

*Primary Examiner* — Benjamin F Fiorello (57) ABSTRACT

A quick-fit self-priming drain pipe, comprises at least two pipes and at least a joint pipe for connecting several pipes. The surface of the pipe is surrounded with several endlong extended slots in the axial direction of the pipe. From the end face of the pipe, the slot comprises a trench hole and a slot opening from inside to outside. The outer surface at the end of the pipe is surrounded with several locating holes. The joint pipe has at least two through holes corresponding to one end of pipe, and its inner surface is surrounded with several locating pieces corresponding to the locating holes. Hereby, the construction operation is simplified, and the working efficiency and draining efficiency are increased greatly.

7 Claims, 8 Drawing Sheets

QUICK-FIT SELF-PRIMING DRAIN PIPE

BACKGROUND OF INVENTION

1. Field of the Invention

The present invention relates generally to a quick-fit self-priming drain pipe, and more particularly to a drain pipe applied to retaining walls, road slope protection, soil drainage and water resource recycling, which has a good effect on soil and water conservation.

2. Description of Related Art

All the engineering construction must be built on the earth, so the moisture contained in the earth determines the stabilization or breakdown of foundation. Once the soil moisture is oversaturated, and it cannot be discharged instantly, there will be such disasters as soil loss and soil slide.

Thus, to overcome the problems of the prior art, it would be an advancement in the art to provide an improved structure that can significantly improve the efficacy.

Therefore, the inventor has provided the present invention of practicability after deliberate design and evaluation based on years of experience in the production, development and design of related products.

SUMMARY OF THE INVENTION

The purpose of the present invention is to overcome the deficiencies in the existing technology to provide a quick-fit self-priming drain pipe.

In order to solve the above problems, the technical scheme of the present invention is described below:

A quick-fit self-priming drain pipe, comprising: at least two pipe bodies and at least a joint pipe; wherein the pipe body is a rigid pipe body having a plurality of slots extending along the pipe body and extending axially on the surface thereof; the slot includes a groove and a narrowly-shaped slit for an inner diameter of the groove to communicate with an outside;

wherein the pipe body includes a plurality of positioning holes disposed near the both ends thereof; the joint pipe is connectable to the pipe body and has at least two ports corresponding to the end of the pipe body and a plurality of positioning members disposed on an inner side thereof and corresponding to the positioning holes.

More particularly, wherein the joint pipe includes a plurality of tensioning slots at both ends of the ports and correspondingly located at both ends of the positioning member.

More particularly, wherein the inner surface of the joint pipe includes stop pieces for blocking the end of the pipe body after the pipe body is inserted in the port.

More particularly, the end face of the positioning member facing the inside of the joint pipe is a bevel face or an arc face.

More particularly, the circumference of at least one end of the pipe body is chamfered.

More particularly, wherein the pipe body is a rigid plastic pipe body.

More particularly, wherein the pipe body is a metal pipe.

After adopting the above technical solution, the present invention has the following beneficial effects compared with the prior art:

1. Good effect on soil and water conservation, in the construction operation of the quick-fit self-priming drain pipe, several trenches are dug in the ground, and then the pipe is laid and covered with soil, the construction is simplified, and the working efficiency and draining efficiency are increased greatly, and it is designed as hard tube, the structural strength is enhanced, it will not be deformed under the pressure of soil cover.

2. A plurality of pipes can be connected to a plurality of joint pipes, so as to form a long pipe, wherein the locating pieces on the inner surface of joint pipe correspond to the locating holes in the pipe, so as to avoid the pipe dropping out, the pipe is connected to the joint pipe more firmly.

3. The circumference of one end of pipe can be chamfered, when the pipe passes through the through hole of joint pipe, the convergent end is convenient for alignment and assembly, so as to reduce the time cost.

4. The joint pipe can be provided with tensioning slots for the pipe to pass through the through hole of joint pipe, when the locating pieces are contacted, the outside diameter of through hole is expanded slightly for assembly, so as to shorten the construction time greatly.

5. There are several stop pieces on the inner surface of joint pipe to keep the end faces of pipes away from each other at an appropriate distance, so that the water on the pipe surface flows into the pipe.

BRIEF DESCRIPTION OF THE DRAWINGS

FIG. 1*a* is an enlarged view of the portion a;

DETAILED DESCRIPTION OF THE INVENTION

Figure 1:
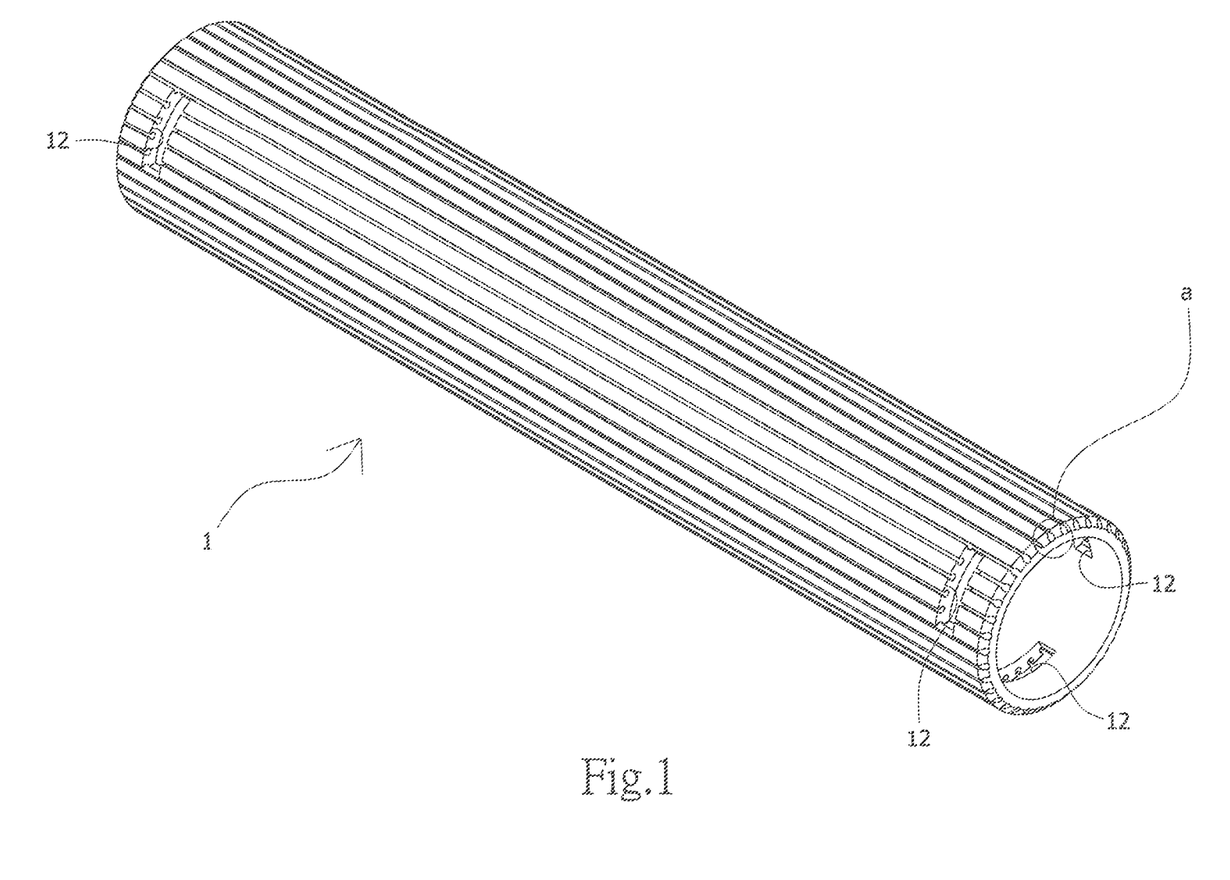
FIG. 1 is a perspective view of a pipe body of the present invention.
Figure 1A:
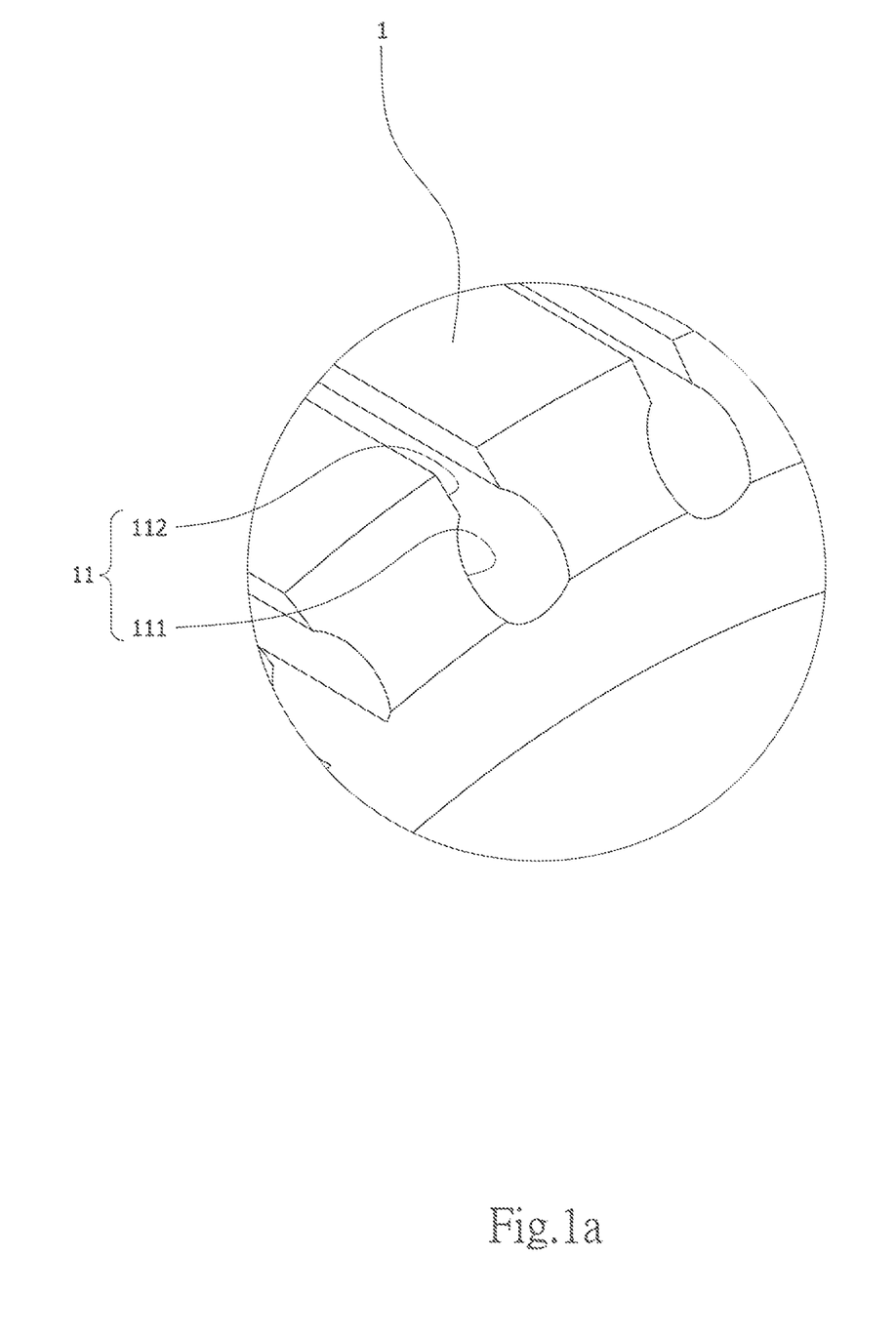
Figure 2:
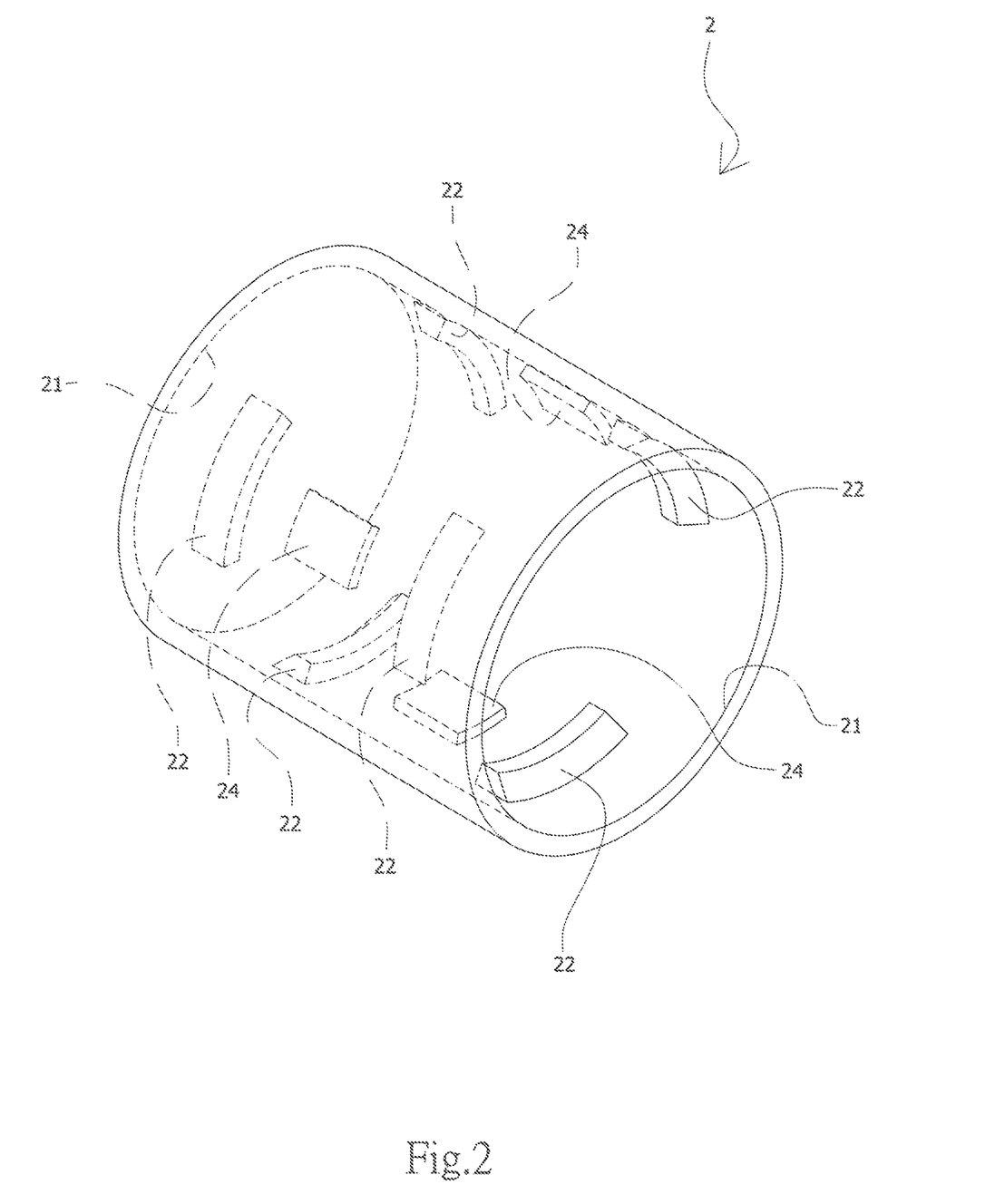
FIG. 2 is a perspective view of a joint pipe of the present invention.
Figure 3:
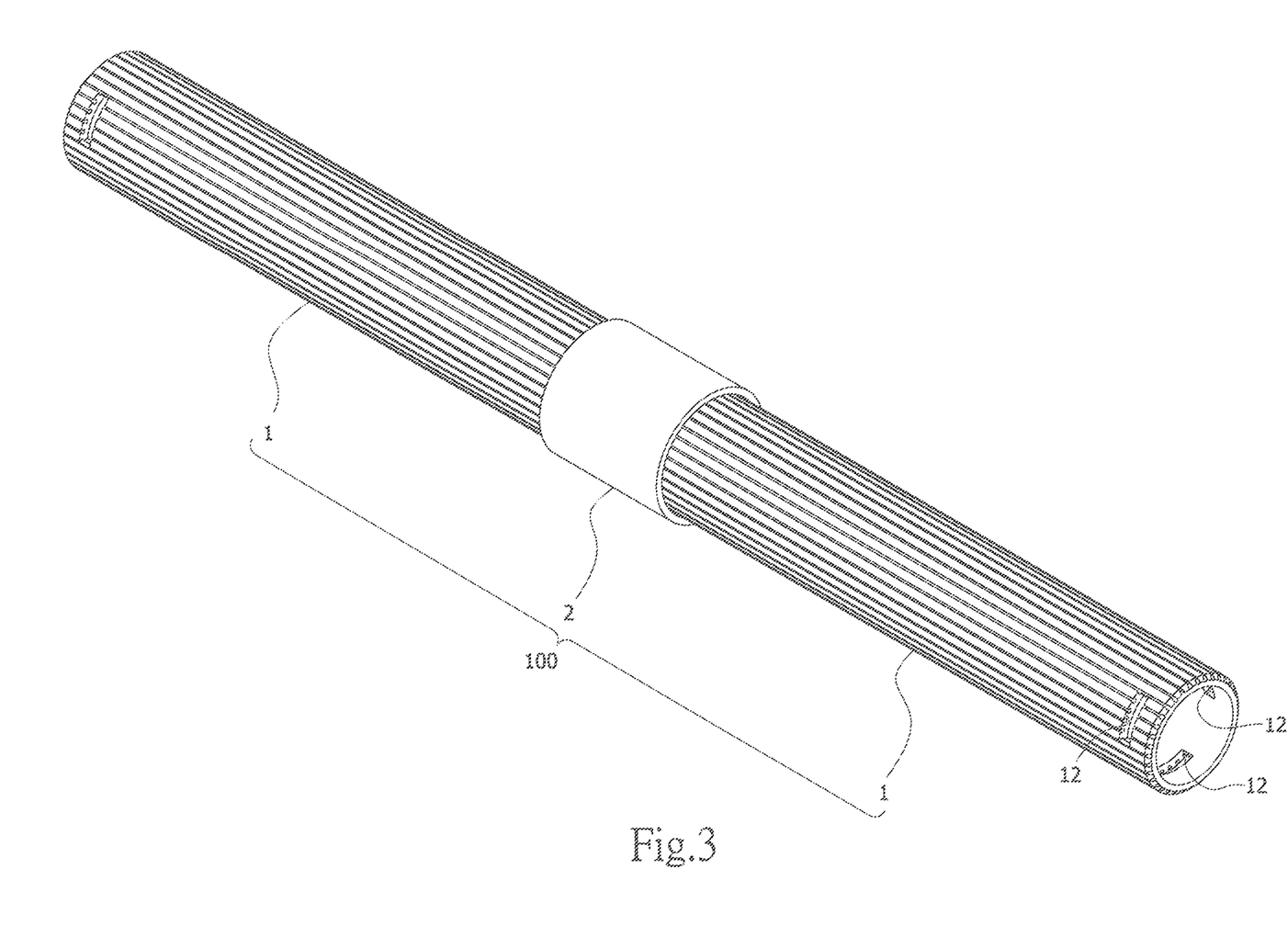
FIG. 3 a three-dimensional diagram of quick-fit self-priming drain pipe of the present invention.

FIG. 3 discloses the quick-fit self-priming drain pipe (100), comprising at least two pipes (1) and at least a joint pipe (2). The pipe body (1) is a hard pipe as shown in FIG. 1, e.g. rigid plastics or metal materials, formed in one, its surface is surrounded with several endlong extended slots (11) in the axial direction of the pipe body (1), from the end face of the pipe body (1), as shown in FIG. 1*a*, the slot (11) comprises a groove (111) and a narrow slit (112) connecting the inside diameter of the groove (111) to the outer side of the pipe body (1) from inside to outside. The outer surface at the ends of the pipe body (1) is surrounded with several positioning holes (12). The joint pipe (2), as shown in FIG. 2, can be connected to the pipe body (1), and it has at least two ports (21) corresponding to one end of the pipe body (1), and its inner surface is surrounded with several locating pieces (22) corresponding to the positioning holes (12).

The present invention only requires several trenches in the land, the pipe body (1) is fitted with the joint pipe (2) and placed in the trench and covered with soil, the overall process is simple, the working efficiency is increased greatly. The pipe body (1) is designed as hard pipe, the structural strength is enhanced, it will not be deformed under the pressure of soil cover, the slot (11) formed of groove (111) and slit (112) can collect and discharge water after landfill.

In terms of the connection mode of the pipe body (1) and joint pipe (2) of the present invention, two pipes (1) can be connected to a joint pipe (2), and multiple pipes (1) can be connected to multiple joint pipes (2) to form a long pipe. The inner surface of joint pipe (2) is provided with several locating pieces (22), which are tenoned in the positioning holes (12) of pipe body (1), so that they can be fastened firmly.

Figure 4:
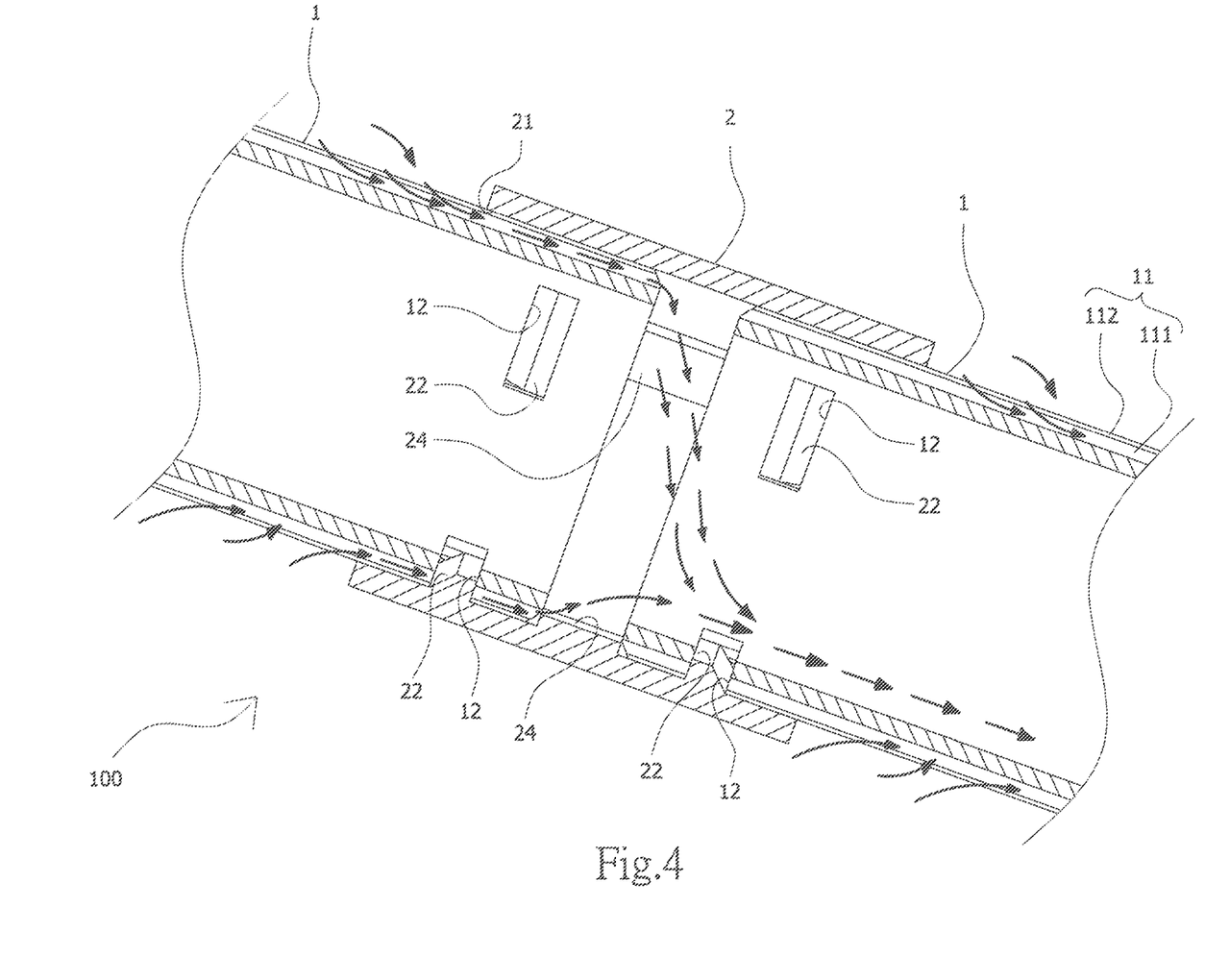
FIG. 4 is a schematic cross-sectional view of the quick-fit self-priming drain of the present invention.

After the pipe body (1) is connected to the joint pipe (2), the drainage pattern is shown in FIG. 4, the water in soil flows into the slots (11) on the surface of pipe body (1), and into the trench holes (111) through the slit (112), the height difference makes the water flows to the low end of pipe body (1). When the water flows to the joint pipe (2), the water collected in the trench holes (111) flows from the low end of pipe body (1) into another pipe body (1), so that the water is discharged from another low end of pipe body (1).

Figure 5:
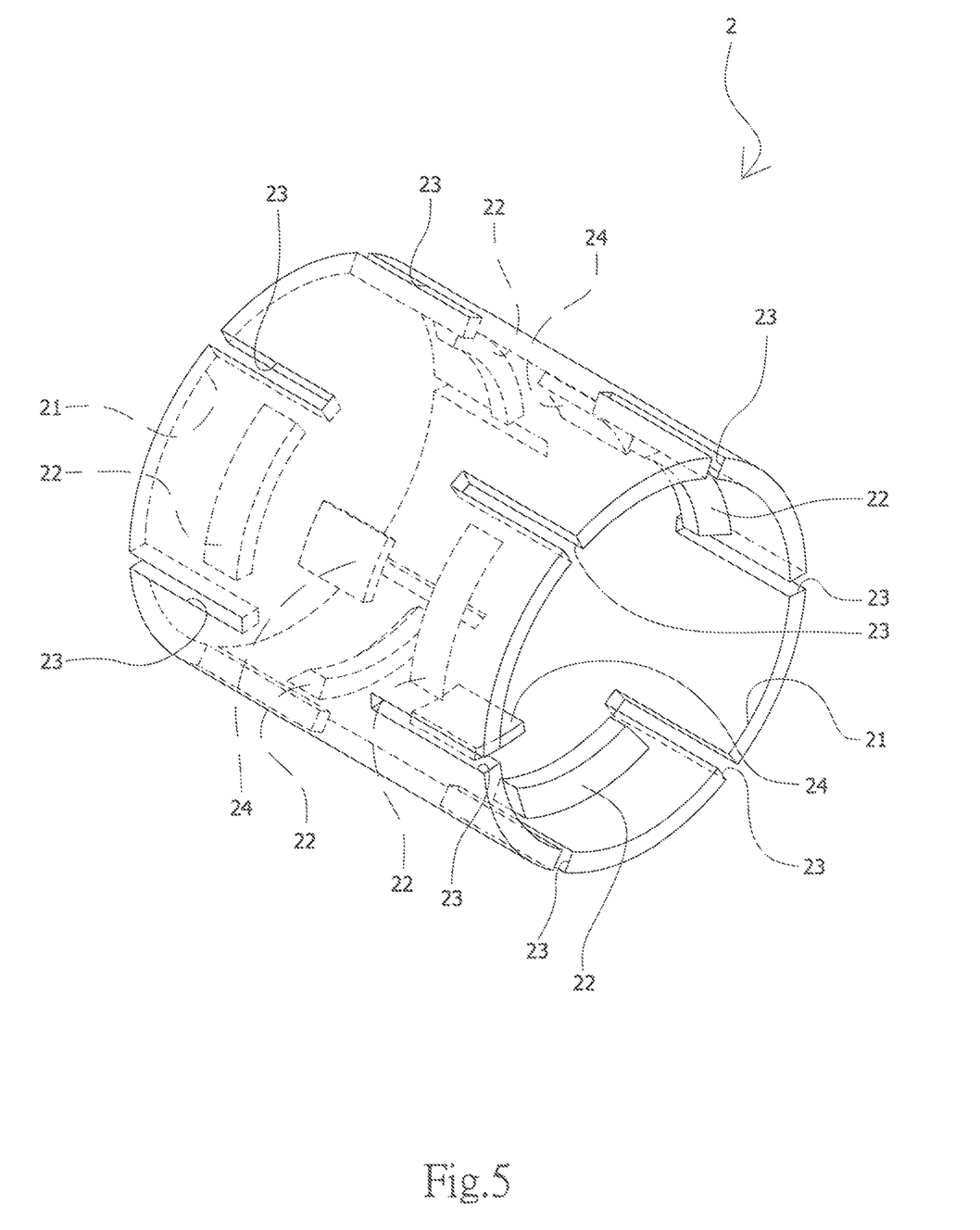
FIG. 5 is a perspective view showing another embodiment of the joint pipe of the present invention.
Figure 6:
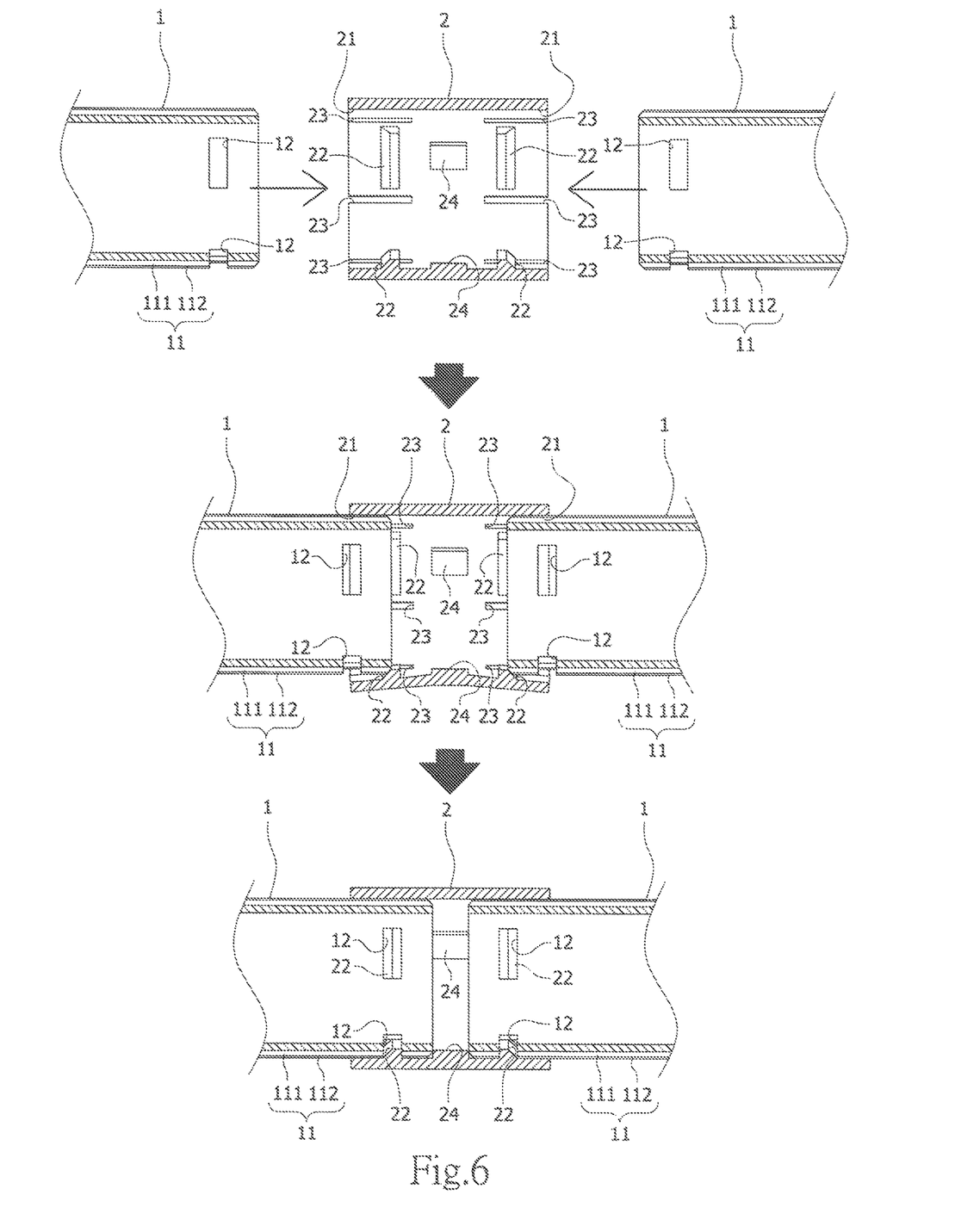
FIG. 6 is a cross-sectional view showing the connection of the joint pipe of FIG. 5 to the two pipes.
Figure 7:
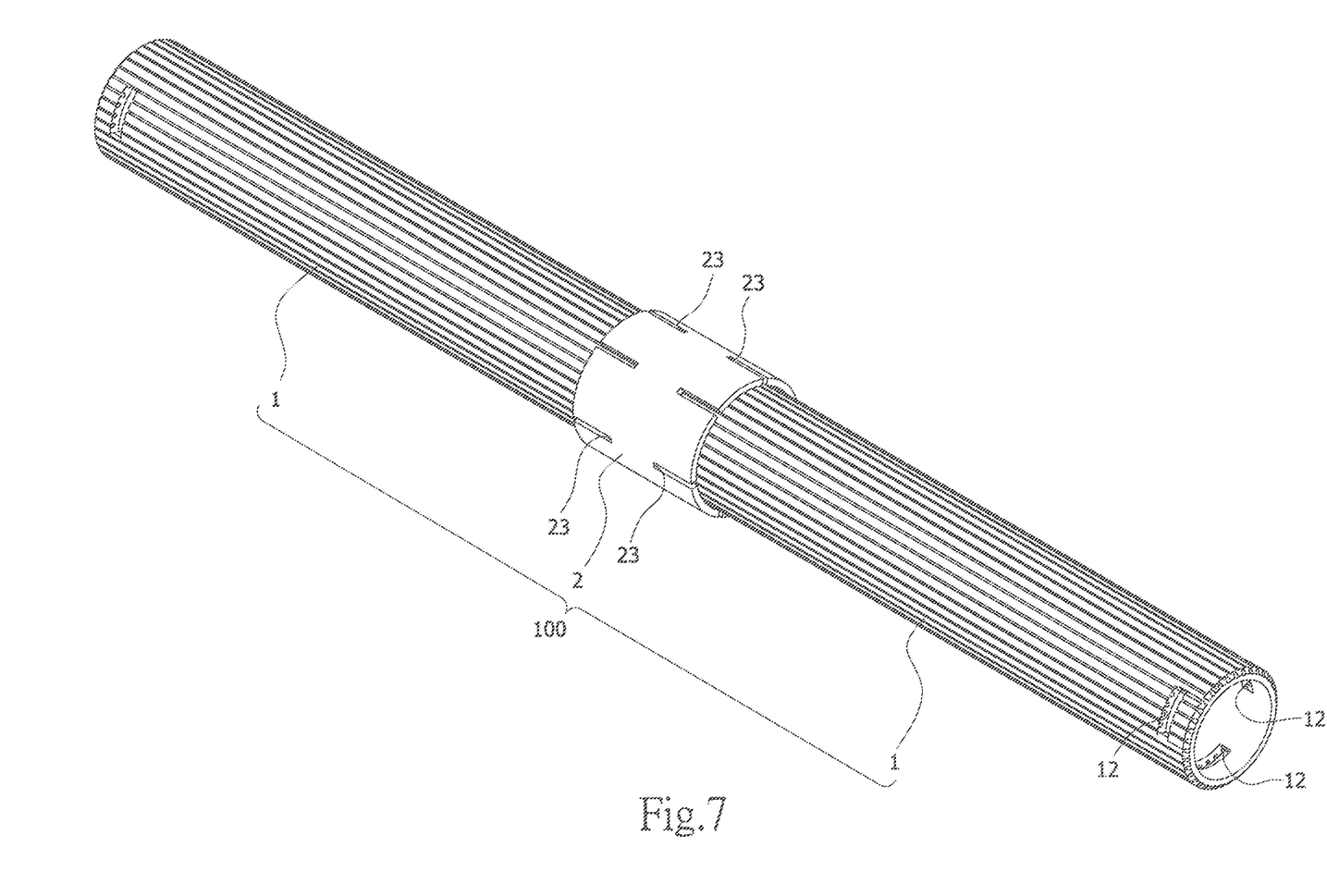
FIG. 7 is a three-dimensional diagram of quick-fit self-priming drain pipe of FIG. 6.

FIG. 5 shows another implementation pattern of joint pipe (2), there are tensioning slots (23) on both sides of the positioning member (22) at the end of port (21), when the pipe body (1) and joint pipe (2) are assembled as shown in FIG. 6, when one end of pipe body (1) passes through the through hole (11) and contacts the positioning member (22), the outside diameter of through hole (11) is forced to expand outwards, when the positioning hole (12) of pipe body (1) corresponds to the positioning member (22), they are clipped, as shown in FIG. 7. In addition, the circumference of one end of pipe body (1) can be chamfered, the pipe body (1) is easy to pass through the through hole (11) for its convergent end, it is favorable for assembly, and the assembly time is shortened greatly, the time cost is reduced.

As shown in FIGS. 5-6, the inner surface of the joint pipe (2) is provided with several stop pieces (24) for propping the end face of the pipe body (1) after the pipe body (1) is inserted in the port (21). They keep the end faces of two pipes (1) away from each other at an appropriate distance without reducing the draining efficiency of slots (11), so that the water on the surface of pipe body (1) can flow into the pipe.

The end face of the positioning member (22) facing the inside of the joint pipe (2) is a bevel face or an arc face. In the case of bevel face, the slots (11) are free from the blocking of locating pieces (22), the height difference makes the water flows through the positioning holes (12) into the pipe body (1). In the case of arc face, the water can flow into the pipe body (1).

The sectional form of the pipe body (1) is one of the following shapes, circle, square and polygon, so the implementation is not limited to the circle shown in the figures.

I claim:

1. A quick-fit self-priming drain pipe, the quick-fit self-priming drain pipe (100) comprising:
    at least two pipe bodies (1) and at least a joint pipe (2);
        wherein the pipe body (1) is a rigid pipe body having a plurality of slots (11) extending along the pipe body (1) and extending axially on the surface thereof; the slot (11) includes a groove (111) and a narrowly-shaped slit (112) for an inner diameter of the groove (111) to communicate with an outside;
    wherein the pipe body (1) includes a plurality of positioning holes (12) disposed near the both ends thereof; the joint pipe (2) is connectable to the pipe body (1) and has at least two ports (21) corresponding to the end of the pipe body (1) and a plurality of positioning members (22) disposed on an inner side thereof and correspondingly to the positioning holes (12).

2. The quick-fit self-priming drain pipe according to claim 1, wherein the joint pipe (2) includes a plurality of tensioning slots (23) at both ends of the ports (21) and correspondingly located at both ends of the positioning member (22).

3. The quick-fit self-priming drain pipe according to claim 1, wherein the inner surface of the joint pipe (2) includes stop pieces (24) for blocking the end of the pipe body (1) after the pipe body (1) is inserted in the port (21).

4. The quick-fit self-priming drain pipe according to claim 1, the end face of the positioning member (22) facing the inside of the joint pipe (2) is a bevel face or an arc face.

5. The quick-fit self-priming drain pipe according to claim 1, the circumference of at least one end of the pipe body (1) is chamfered.

6. The quick-fit self-priming drain pipe defined in claim 1, wherein the pipe body (1) is a rigid plastic pipe body.

7. The quick-fit self-priming drain pipe according to claim 1, wherein the pipe body (1) is a metal pipe.

* * * * *